US011251816B2

(12) United States Patent
Zhang et al.

(10) Patent No.: US 11,251,816 B2
(45) Date of Patent: Feb. 15, 2022

(54) FULL-BAND RADIO FREQUENCY DEVICE AND COMMUNICATION TERMINAL BASED ON FREQUENCY BAND B41

(71) Applicant: HUIZHOU TCL MOBILE COMMUNICATION CO., LTD., Huizhou (CN)

(72) Inventors: Hua Zhang, Huizhou (CN); Zhicong Yu, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 48 days.

(21) Appl. No.: 16/713,021

(22) Filed: Dec. 13, 2019

(65) Prior Publication Data

US 2020/0145029 A1    May 7, 2020

Related U.S. Application Data

(63) Continuation of application No. PCT/CN2018/096684, filed on Jul. 23, 2018.

(30) Foreign Application Priority Data

Jul. 21, 2017    (CN) .......................... 201710601313.6

(51) Int. Cl.
H04B 1/04    (2006.01)
H04B 1/00    (2006.01)
H04B 1/401    (2015.01)

(52) U.S. Cl.
CPC ............. *H04B 1/0057* (2013.01); *H04B 1/04* (2013.01); *H04B 1/401* (2013.01); *H04B 2001/0408* (2013.01)

(58) Field of Classification Search
CPC ....................................................... H04L 12/28
(Continued)

(56) References Cited

U.S. PATENT DOCUMENTS

2014/0307836 A1    10/2014 Khiat
2014/0321339 A1    10/2014 Pehlke
(Continued)

FOREIGN PATENT DOCUMENTS

CN    105553499 A    5/2016
CN    105656610 A    6/2016
(Continued)

OTHER PUBLICATIONS

European search report and Written Opinion for related European Application No. 18834645.6 dated Jul. 3, 2020;(8 pages).
(Continued)

*Primary Examiner* — Dang T Ton

(57) ABSTRACT

The present disclosure provides a full-band radio frequency device based on a frequency band B41, which includes a main part and a diversity part; the main part includes a power amplifier circuit configured to perform amplification processing on an output signal, a first filter circuit configured to perform filter processing on a transmitted or received signal in a first frequency band, and a duplex circuit configured to transmit or receive signals in a second frequency band; the diversity part includes a second filter circuit configured to perform filter processing on a received signal in a third frequency band, and a third filter circuit configured to perform filter processing on a received signal in a fourth frequency band; the first frequency band and the second frequency band are combined into a full-band B41, and the third frequency band and the fourth frequency band are combined into a full-band B41.

19 Claims, 5 Drawing Sheets

(58) Field of Classification Search
USPC .......................................................... 370/400
See application file for complete search history.

(56) References Cited

U.S. PATENT DOCUMENTS

2015/0372702 A1    12/2015  Asuri et al.
2020/0343930 A1*   10/2020  DiTommaso ............ H04B 1/44

FOREIGN PATENT DOCUMENTS

| CN | 205945728 U | 2/2017 |
| CN | 106921405 A | 7/2017 |
| CN | 107171676 A | 9/2017 |

OTHER PUBLICATIONS

First Office Action for related International Application No. 201710601313.6 dated Jul. 3, 2019;(6 pages).
International Search Report for related International Application No. PCT/CN2018096684 dated Oct. 16, 2018;(2 pages).

* cited by examiner

FULL-BAND RADIO FREQUENCY DEVICE AND COMMUNICATION TERMINAL BASED ON FREQUENCY BAND B41

CROSS-REFERENCE TO RELATED APPLICATIONS

The present application is a continuation-application of International (PCT) Patent Application No. PCT/CN2018/096684, filed on Jul. 23, 2018, which claims foreign priority of Chinese Patent Application No. 201710601313.6, filed on Jul. 21, 2017 in the China National Intellectual Property Administration, the entire contents of which are hereby incorporated by reference.

FIELD

The described embodiments relate to a communication technology, and more particularly, to a full-band radio frequency device based on a frequency band B41, and a communication terminal.

BACKGROUND

Currently, as for the market is becoming wider and wider, requirements of the frequency band B41 become wider and wider, and the bandwidth of 2555 MHz-2655 MHz (megahertz) is not limited to be used in the Chinese market. In order to make the same product not only to be used in the Chinese market, but also to be used in the frequency band B41 to be met in other regions such as Japan and United States, a design of the full-band B41 (2496 MHz-2690 MHz) is required. In the previous designs, the main part uses the TRX SAW (transmitting and receiving filter) of the full-band B41, and the diversity part is uses the DRX SAW (receiving filter) of the full-band B41. The specific implementation circuit is shown in FIG. 1 and FIG. 2.

The defects of the above-mentioned designs are as the following description. (1) The SAW package of the TRX part supporting the full-band B41 is 2016 size, and the SAW type of the DRX part is 1411 size. Both types are relatively large in size, and the size requirements of the layout are relatively high. With the integration of frequency bands of the projects is higher and higher, it is difficult to make it bigger, to place such a large device while ensuring good performance. (2) Since the frequency band is wider, the price of a device of full-band is relatively higher. For example, the price of the TRX SAW device is above 0.34 US dollars, so that the overall price of the product designing will be higher.

Therefore, the related art has yet to be improved.

SUMMARY

In view of the above-mentioned deficiencies of the related art, a purpose of the present disclosure is to provide a full-band radio frequency device and a communication terminal based on a frequency band B41. A main part and a diversity part are all realized by combining different frequency bands to realize the full-band communication in the frequency band B41. It may be advantageous for packaging the product, and the price of the device may be lower than the direct use of the full-band, so that the production cost may be saved.

In order to achieve the above-mentioned purpose, the present disclosure adopts the following technical solutions.

A full-band radio frequency device based on a frequency band B41, including a main part and a diversity part; wherein the main part includes a power amplifier circuit, a first filter circuit, and a duplex circuit; the power amplifier circuit is configured to perform amplification processing on an output signal; the first filter circuit is configured to perform filter processing on a transmitted or received signal in a first frequency band; the duplex circuit is configured to transmit or receive signals in a second frequency band; the diversity part includes a second filter circuit, and a third filter circuit; the second filter circuit is configured to perform filter processing on a received signal in a third frequency band; the third filter circuit is configured to perform filter processing on a received signal in a fourth frequency band; wherein the first frequency band and the second frequency band are combined into a full-band B41, and the third frequency band and the fourth frequency band are combined into a full-band B41.

The present disclosure further provides a communication terminal, which includes the full-band radio frequency device based on the frequency band B41.

Compared to the related art, the full-band radio frequency device based on a frequency band B41 provided by the present disclosure, includes a main part and a diversity part; wherein the main part includes a power amplifier circuit, a first filter circuit, and a duplex circuit; the power amplifier circuit is configured to perform amplification processing on an output signal; the first filter circuit is configured to perform filter processing on a transmitted or received signal in a first frequency band; the duplex circuit is configured to transmit or receive signals in a second frequency band; the diversity part includes a second filter circuit, and a third filter circuit; the second filter circuit is configured to perform filter processing on a received signal in a third frequency band; the third filter circuit is configured to perform filter processing on a received signal in a fourth frequency band; wherein the first frequency band and the second frequency band are combined into a full-band B41, and the third frequency band and the fourth frequency band are combined into a full-band B41. A main part and a diversity part are all realized by combining different frequency bands to realize the full-band communication in the frequency band B41. It may be advantageous for packaging the product, and the price of the device may be lower than the direct use of the full-band, so that the production cost may be saved.

DETAILED DESCRIPTION

In view of the disadvantages of the over-sized and high cost of the full-band communication projects in the frequency band B41 in the related art, the purpose of the present disclosure is to provide a full-band radio frequency device and a communication terminal based on a frequency band B41. A main part and a diversity part are all realized by combining different frequency bands to realize the full-band communication in the frequency band B41. It may be advantageous for packaging the product, and the price of the device may be lower than the direct use of the full-band, so that the production cost may be saved.

The present disclosure will be further described in detail below with reference to the drawings and embodiments. It is understood that the specific embodiments described herein are merely illustrative of the disclosure and are not intended to limit the disclosure.

Figure 1:
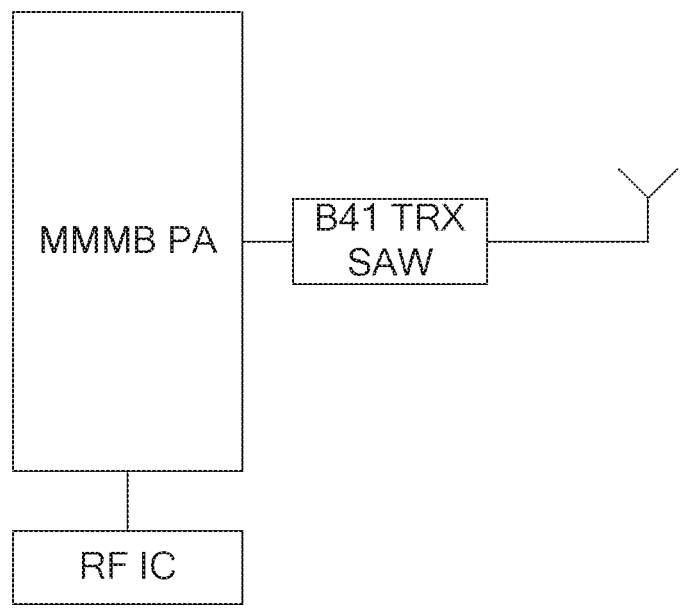
FIG. 1 is a structural block diagram of a main part of a radio frequency device based on a frequency band B41 in the related art.
Figure 2:
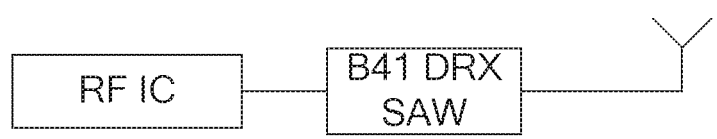
FIG. 2 is a structural block diagram of a diversity part of a radio frequency device based on a frequency band B41 in the related art.
Figure 3:
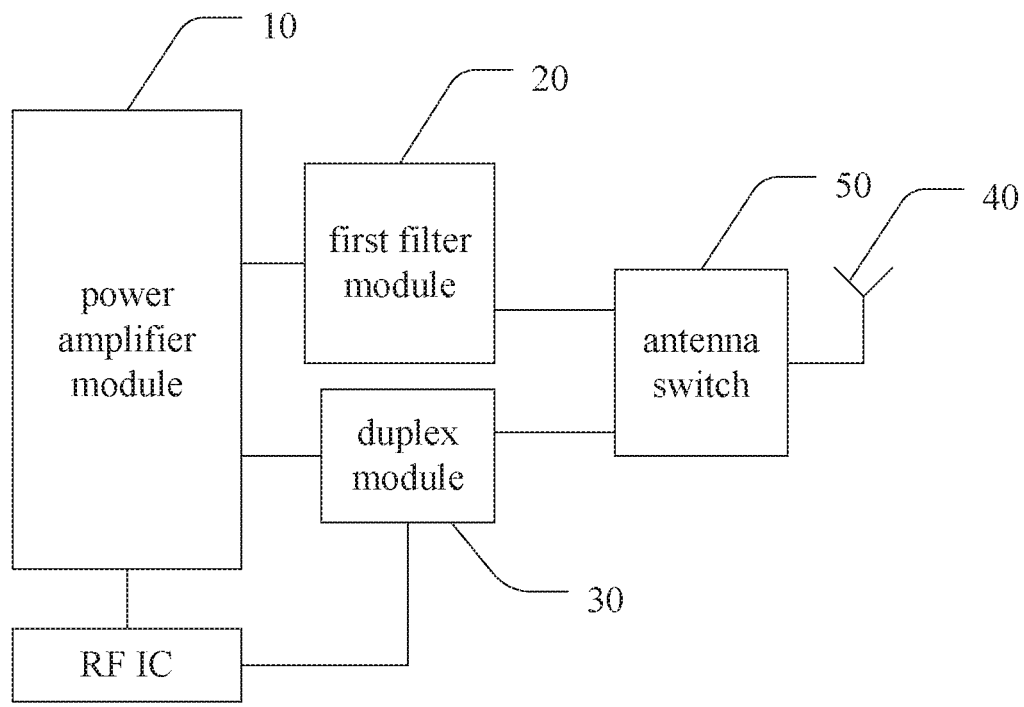
FIG. 3 is a structural block diagram of a main part of a radio frequency device based on a frequency band B41 in the present disclosure.
Figure 4:
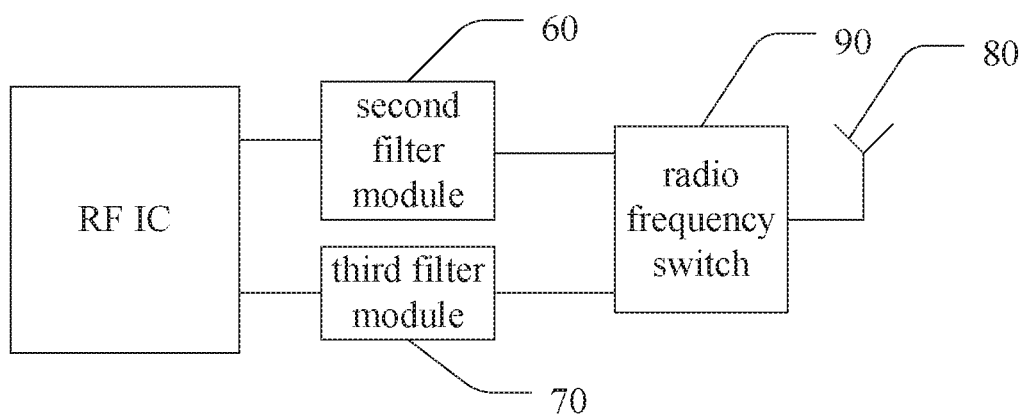
FIG. 4 is a structural block diagram of a diversity part of a radio frequency device based on a frequency band B41 in the present disclosure.

Referring to FIG. 3 and FIG. 4, the full-band radio frequency device based on a frequency band B41 provided by the present disclosure, may include a main part and a diversity part. The main part may include a power amplifier module 10, a first filter module 20, and a duplex module 30. The diversity part may include a second filter module 60 and a third filter module 70. The power amplifier module 10 may be connected to the first filter module 20 and the duplex module 30. The duplex module 30 and the power amplifier module 10 may be further connected to a radio frequency chip, i.e., a RF IC. The second filter module 60 and the third filter module 70 may be also connected to the radio frequency chip. The power amplifier module 10 may be configured to perform amplification processing on an output signal. The first filter module 20 may be configured to perform filter processing on a transmitted or received signal in a first frequency band. The duplex module 30 may be configured to transmit or receive signals in a second frequency band. The third filter module 70 may be configured to perform filter processing on a received signal in a fourth frequency band. In addition, the first frequency band and the second frequency band may be combined into a full-band B41, and the third frequency band and the fourth frequency band may be combined into a full-band B41.

Further, the main part may further include a first antenna 40 and an antenna switch 50 configured to control an operation state of the first antenna 40. The antenna switch 50 may be connected to the first antenna 40, the first filter module 20 and the duplex module 30. The diversity part may further include a second antenna 80 and a radio frequency switch 90 configured to control an operation state of the second antenna 80. The radio frequency switch 90 may be connected to the second antenna 80, the second filter module 60, and a third filter module 70. When the antenna switch 50 and the radio frequency switch 90 are turned on, the first antenna 40 and the second antenna 80 may start to operate, to receive an external signal and transmit a signal to outside.

The main part and the diversity part may realize the full-band communication in the frequency band B41 by combining the devices of different frequency bands. When the radio frequency chip works, it may receive signals of the main part and the diversity part at the same time, to improve signal quality, sensitivity or achieve a special performance such as MIMO (Multi-input Multi-output). Since the main part needs to include a function of transmitting signals, for a FDD (Frequency Division Duplex), the main part may use the duplex module 30 to transmit and receive signals simultaneously. The diversity part only needs to receive signals, so that the second filter module 60 and the third filter module 70 may be used to filter a received signal and transmit it to the radio frequency chip, to realize the transmission and reception of the radio frequency signal. In this embodiment, the MT6169 of the MTK may be adopted to the radio frequency chip. Other radio frequency chips with same functions may also be adopted in other embodiments, it is not limited in the present disclosure.

Figure 5:
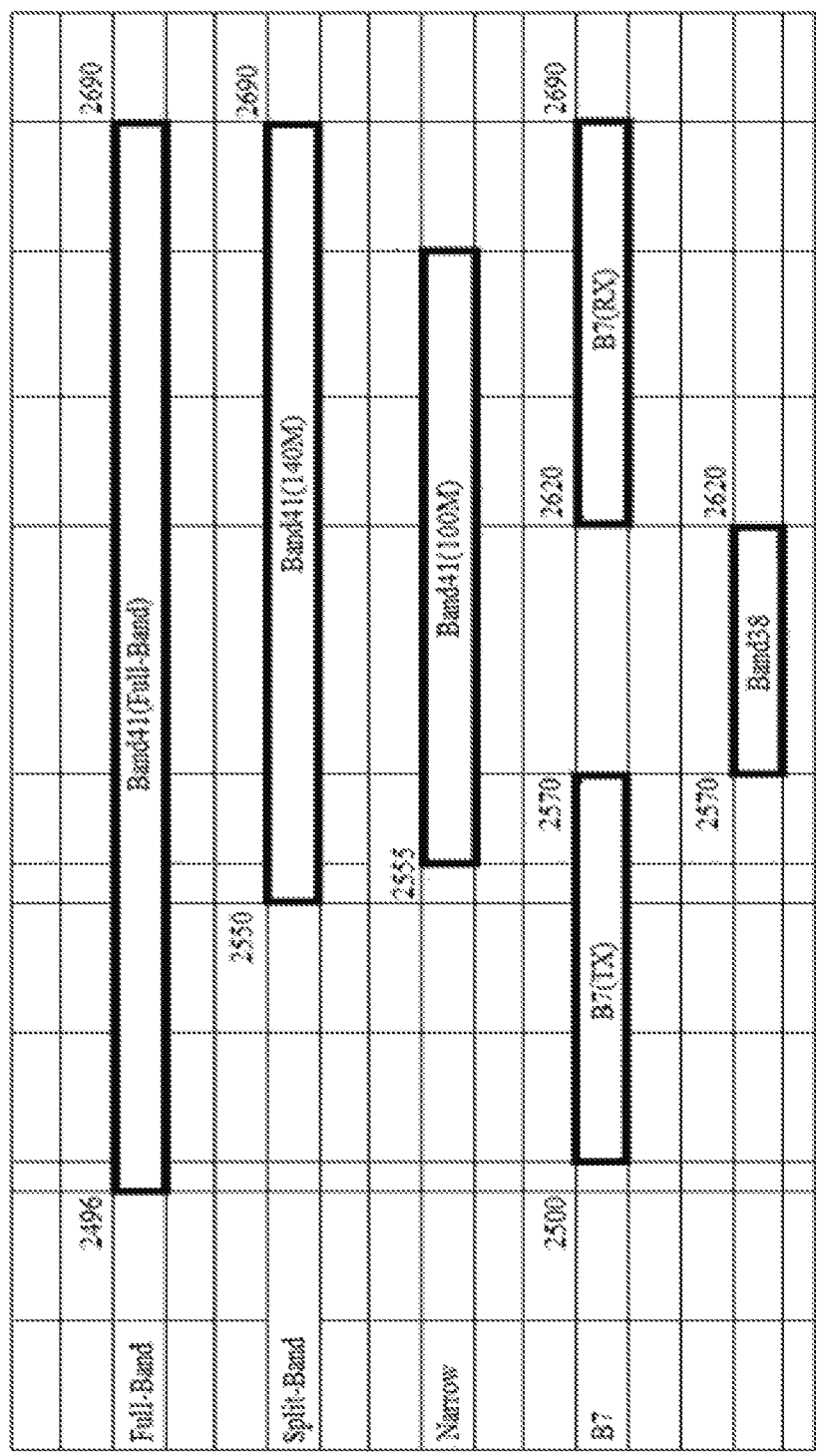
FIG. 5 is a distribution diagram of a full-band B41 and a frequency band B7 in an embodiment of a radio frequency device based on a frequency band B41 in the present disclosure.
Figure 6:
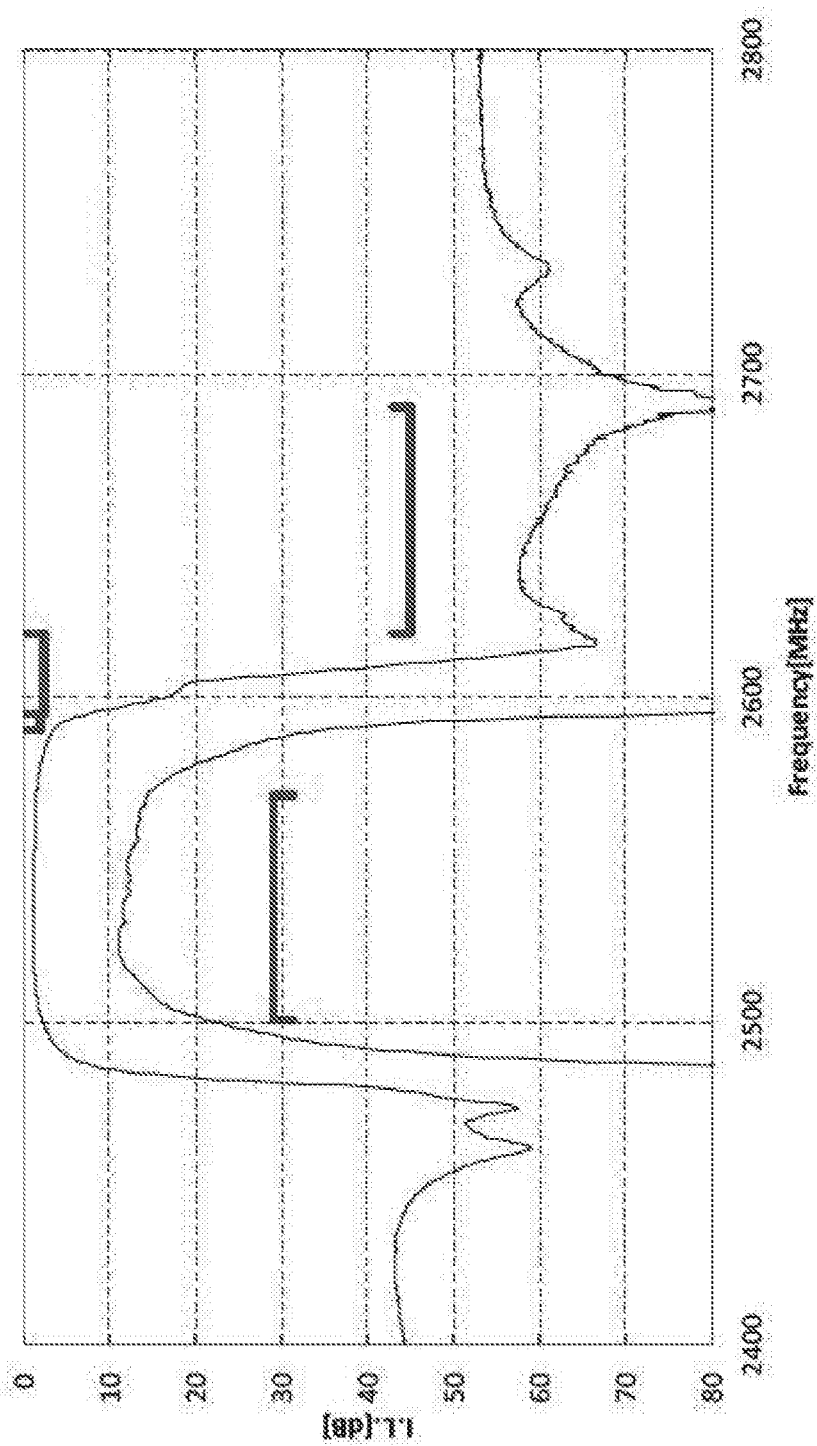
FIG. 6 is a simulation test curve diagram of a TX band in a B7 duplexer in an embodiment of a radio frequency device based on a frequency band B41 in the present disclosure.

Referring to FIG. 5 and FIG. 6, the full-band B41 may be 2496 MHz-2690 MHz. Since a TX (transmit) frequency band of a frequency band B7 and a low frequency band of the full-band B41 are basically overlapped, there is only a small part (2496 MHz-2500 MHz, and 2570 MHz-2580 MHz) not be overlapped. However, according to designs of duplexer, the bandwidth used is wider than the actual frequency band. According to actual testing results of the frequency band TX (transmit) of the frequency band B7, as shown in FIG. 6, it may overlap 2496 MHz-2500 MHz. Further, a frequency band RX (receive) of the frequency band B7 and a high frequency of the full-band B41 are fully reused. Therefore, based on the above-mentioned relationship, in an embodiment of the present disclosure, the first frequency band may be 2580 MHz-2690 MHz, the second frequency band may be 2496 MHz-2580 MHz, the third frequency band may be 2496 MHz-2620 MHz, and the fourth band may be 2620 MHz-2690 MHz. By combining the devices of different frequency bands, the main part and the diversity part may realize the full-band communication in the frequency band B41. Compared with a device of the full-band, the cost may be reduced, and the package size may be reduced. It may be advantageous for improving product integration.

Figure 7:
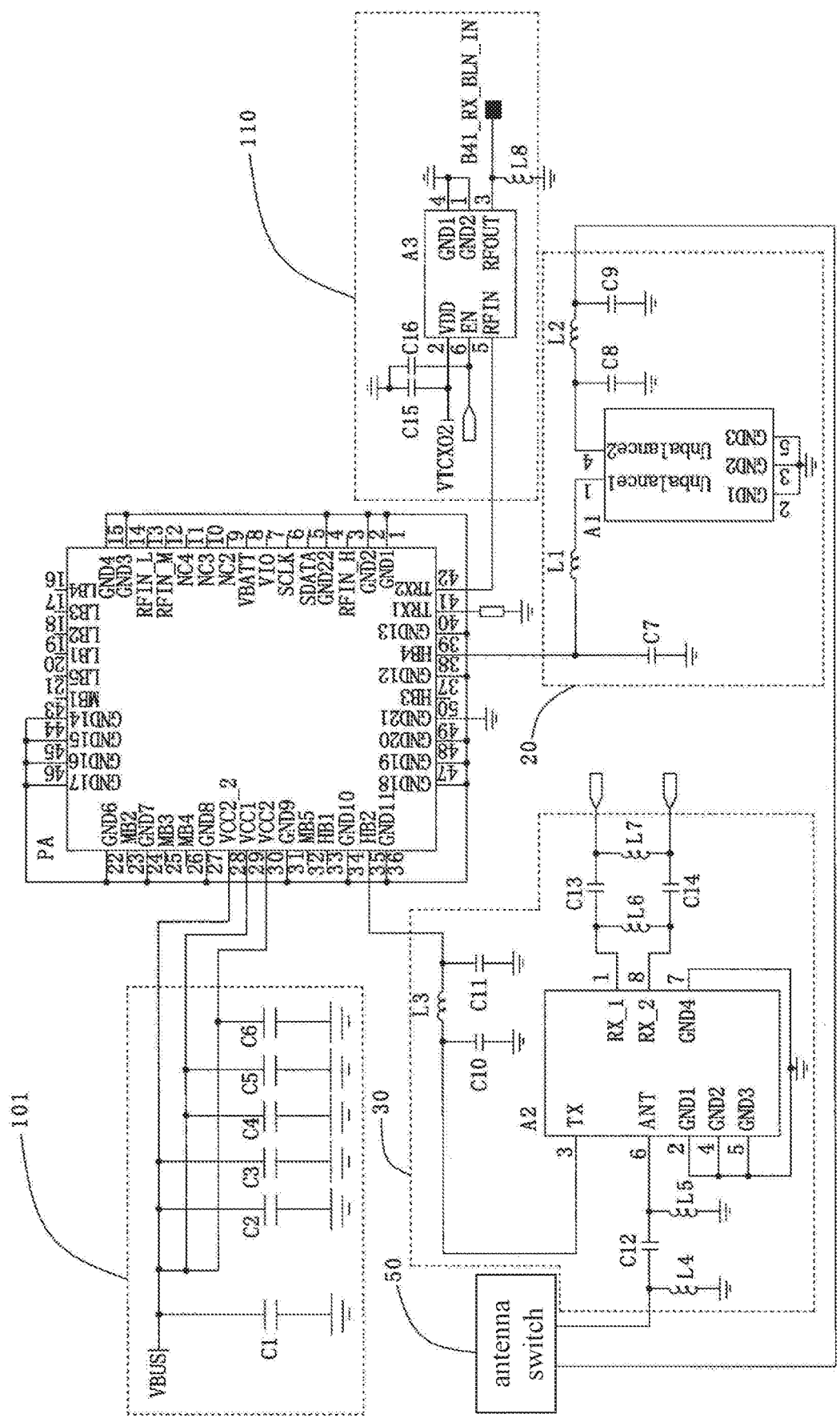
FIG. 7 is a circuit diagram of a power amplifier module, a first filter module, and a duplex module in a radio frequency device based on a frequency band B41 in the present disclosure.

Specifically, referring to FIG. 7, the power amplifier module 10 may include a multi-mode multi-frequency power amplifier PA and a filter unit 101. The filter unit 101 may be connected to the multi-mode multi-frequency power amplifier PA. The multi-mode multi-frequency power amplifier PA may be further connected to a first filter module 20 and the duplex module 30. The filter unit 101 may perform filter processing on power supply voltage which is input to the multi-mode multi-frequency power amplifier PA. The multi-mode multi-frequency power amplifier PA may perform amplification processing on an output signal and output the output signal to the first filter 20 module and the duplex module 30. In the present disclosure, ripple voltage may be reduced by performing filter processing by the filter unit 101, on the power supply voltage which is input to the multi-mode multi-frequency power amplifier PA. In this embodiment, a power amplifier of the type AP7219M may be adopted to the multi-mode multi-frequency power amplifier PA. In other embodiments, other power amplifiers with same functions may be adopted, it is not limited in the present disclosure.

Specifically, the filter unit 101 may include a first capacitor C1, a second capacitor C2, a third capacitor C3, a fourth capacitor C4, a fifth capacitor C5, and a sixth capacitor C6. One end of the first capacitor C1 may be connected to one end of the second capacitor C2, one end of the fourth capacitor C4, one end of the sixth capacitor C6, and a first power supply end (a VBUS pin in this embodiment). The end of the second capacitor C2 may be further connected to one end of the third capacitor C3 and a 28th pin of the multi-mode multi-frequency power amplifier PA. The end of the fourth capacitor C4 may be further connected to one end of the fifth capacitor C5 and a 29th pin of the multi-mode multi-frequency power amplifier PA. The end of the sixth capacitor C6 may be further connected to a 30th pin of the multi-mode multi-frequency power amplifier PA. The other end of the first capacitor C1, the other end of the second capacitor C2, the other end of the third capacitor C3, the other end of the fourth capacitor C4, the other end of the fifth capacitor C5, and the other end of the sixth capacitor C6 may be grounded.

Further, the first filter module 20 may include a filter A1, a seventh capacitor C7, an eighth capacitor C8, a ninth capacitor C9, a first inductor L1, and a second inductor L2. A 1st pin of the filter A1 may be connected to the multi-mode multi-frequency power amplifier PA and one end of the seventh capacitor C7 through the first inductor L1, and the other end of the seventh capacitor C7 may be grounded. A 2nd pin of the filter A1 may be connected to one end of the eighth capacitor C8 and one end of the second inductor L2, and the other end of the eighth capacitor C8 may be grounded. The other end of the second inductor L2 may be grounded through the ninth capacitor C9, and further connected to the antenna switch 50. Capacitors and inductors in the first filter module 20 may be combined into a matching circuit to achieve impedance matching, specifically for adjusting a circuit, a device, and so on, to 50 ohm impedance. In this embodiment, the filter A1 may be a B41 TRX SAW of a frequency band in 2580 MHz-2690 MHz, i.e., a surface wave filter, and its type may be SAFFB2G35MAOFOA. In other embodiments, other filters with same functions may be adopted, it is not limited in the present disclosure.

Further, the duplex module 30 may include a duplexer A2, a tenth capacitor C10, an eleventh capacitor C11, a twelfth capacitor C12, a thirteenth capacitor C13, a fourteenth capacitor C14, a third inductor L3, a fourth inductor L4, a fifth inductor L5, a sixth inductor L6, and a seventh inductor L7. A 3rd pin of the duplexer A2 may be connected to one end of the tenth capacitor C10 and one end of the third inductor L3, and the other end of the tenth capacitor C10 may be grounded. The other end of the third inductor L3 may be connected to a 35th pin of the multi-mode multi-frequency power amplifier PA, and may be further grounded through the eleventh capacitor C11. A 6th pin of the duplexer A2 may be connected to one end of the fifth inductor L5 and one end of the twelfth capacitor C12, and the other end of the fifth inductor L5 may be grounded. The other end of the twelfth capacitor C12 may be grounded through the fourth inductor L4, and further connected to the antenna switch 50. A 1st pin of the duplexer A2 may be connected to one end of the sixth inductor L6 and one end of the thirteenth capacitor C13, and the other end of the sixth inductor L6 may be connected to an 8th pin of the duplexer A2 and one end of the fourteenth capacitor C14. The other end of the thirteenth capacitor C13 may be connected to one end of the seventh inductor L7, and the other end of the seventh inductor L7 may be connected to the other end of the fourteenth capacitor C14. Capacitors and inductors in the duplex module 30 may be combined into a matching circuit to achieve impedance matching, specifically for adjusting a circuit, a device, and so on, to 50 ohm impedance. In this embodiment, the duplexer A2 may be a type of SAYEY2G53CA0F0A, which may be configured to transmit and receive signals in a 2496 MHz-2580 MHz band. A switch chip of a type AP6716M may be adopted to the antenna switch 50. In other embodiments, other duplexers A2 and switch chips with same functions may be adopted, it is not limited in the present disclosure.

In the full-band radio frequency devices based on the frequency band B41 provided by the present disclosure, after removing a reused frequency band B7, a TRX SAW of the main part in the remaining frequency band B41 (2580 MHz-2690 MHz) may be implemented in a 1411 package. In the market, such mature devices that may be adopted to reduce package size and save new device development costs. In addition to the reused band B7, the diversity part in the remaining frequency band B41 (2496 MHz-2610 MHz) may be implemented in an 1109 package. Therefore, the package of the main part or the diversity part may be reduced. A layout and a wiring may be improved. The device cost may be also reduced. It may be also advantageous for reducing the cost of the entire product.

The full-band radio frequency device based on the frequency band B41 provided by the present disclosure, may further include a transform matching module 110 configured to match impedance, and which may be connected to the multi-mode multi-frequency power amplifier PA. Referring to FIG. 7, in this embodiment, the transform matching module 110 may be a balun in the frequency band B41. Since a balanced circuit and an unbalanced circuit have different electrical characteristics when signals are transmitted and received, they cannot be easily connected to each other. The impedance matching may be performed by the transform matching module 110 to provide impedance conversion for the two different circuits, thereby a purpose of interference reducing may be achieved. The transform matching module 110 may include a converter A3, a fifteenth capacitor C15, a sixteenth capacitor C16, and an eighth inductor L8. One end of the fifteenth capacitor C15 may be connected to a 2nd pin of the converter A3. One end of the sixteenth capacitor C16 may be connected to a 6th pin of the converter A3. The other end of the fifteenth capacitor C15 and the other end of the sixteenth capacitor C16 may be grounded. A 5th Pin of the converter A3 may be connected to a 42th pin of the multi-mode multi-frequency power amplifier PA. A 3rd pin of the converter A3 may be a signal receiving input terminal in the frequency band B41 (i.e., a B41_RX_BLN_IN terminal), which may be also grounded through the eighth inductor L8.

Based on the above-mentioned full-band radio frequency device based on the frequency band B41, the present disclosure further provides a communication terminal, which may include the above-mentioned full-band radio frequency device based on the frequency band B41. The full-band radio frequency device based on the frequency band B41 has been described above in detail, therefore no additional description is given herein.

In summary, in the full-band radio frequency device based on the frequency band B41 provided by the present disclosure, the full-band radio frequency device based on the frequency band B41 includes the main part and the diversity part; wherein the main part includes the power amplifier module, the first filter module, and the duplex module; the power amplifier module is configured to perform amplification processing on the output signal; the first filter module is configured to perform filter processing on the transmitted or received signal in the first frequency band; the duplex module is configured to transmit or receive signals in the second frequency band; the diversity part includes the second filter module, and the third filter module; the second filter module is configured to perform filter processing on the received signal in the third frequency band; the third filter module is configured to perform filter processing on the received signal in the fourth frequency band; wherein the first frequency band and the second frequency band are combined into the full-band B41, and the third frequency band and the fourth frequency band are combined into the full-band B41. The main part and the diversity part realize the full-band communication in the frequency band B41 by combining different frequency bands. It may be advantageous for packaging the product, and the price of the device may be lower than the direct use of the full-band, so that the production cost may be saved.

It should be understood that, those skilled in the art may make equivalent substitutions or changes to the embodiments in the present disclosure, and all such changes or substitutions belong to the scope of the appended claims.

What is claimed is:

1. A full-band radio frequency device based on a frequency band B41, comprising a main part and a diversity part: wherein
the main part comprises
a power amplifier circuit,
a first filter circuit,
a duplex circuit,
a first antenna, and
an antenna switch configured to control an operation state of the first antenna;
the power amplifier circuit is connected to the first filter circuit and the duplex circuit;
the duplex circuit and the power amplifier circuit are further connected to a radio frequency chip;
the antenna switch is connected to the first antenna, the first filter circuit and the duplex circuit;
the power amplifier circuit is configured to perform amplification processing on an output signal;
the first filter circuit is configured to perform filter processing on a transmitted or received signal in a first frequency band;
the duplex circuit is configured to transmit or receive signals in a second frequency band;
the diversity part comprises
a second filter circuit,
a third filter circuit,
a second antenna, and
a radio frequency switch configured to control an operation state of the second antenna;
the second filter circuit and the third filter circuit are connected to the radio frequency chip;
the radio frequency switch is connected to the second antenna, the second filter circuit, and a third filter circuit;
the second filter circuit is configured to perform filter processing on a received signal in a third frequency band;
the third filter circuit is configured to perform filter processing on a received signal in a fourth frequency band;
the first frequency band and the second frequency hand are combined into a full-band B41, and the third frequency band and the fourth frequency band are combined into a full-band B41;
wherein the full-band B41 is 2496 MHz-2690 MHz; the first frequency band is 2580 MHz-2690 MHz, the second frequency band is 2496 MHz-2580 MHz; the third frequency band is 2496 MHz-2620 MHz, and the fourth frequency band is 2620 MHz-2690 MHz.

2. The full-band radio frequency device based on the frequency band B41 according to claim 1, wherein the power amplifier circuit comprises a multi-mode multi-frequency power amplifier and a filter unit; the filter unit is configured to perform filter processing on power supply voltage which is input to the multi-mode multi-frequency power amplifier; and the multi-mode multi-frequency power amplifier is configured to perform amplification processing on an output signal and outputs the output signal to the first filter circuit and the duplex circuit.

3. A full-band radio frequency device based on a frequency band B41, comprising a main part and a diversity part; wherein
the main part comprises
a power amplifier circuit,
a first filter circuit, and
a duplex circuit;
the power amplifier circuit is configured to perform amplification processing on an output signal;
the first filter circuit is configured to perform filter processing on a transmitted or received signal in a first frequency band;
the duplex circuit is configured to transmit or receive signals in a second frequency band;
the diversity part comprises
a second filter circuit, and
a third filter circuit;
the second filter circuit is configured to perform filter processing on a received signal in a third frequency band;
the third filter circuit is configured to perform filter processing on a received signal in a fourth frequency band;
wherein the first frequency band and the second frequency band are combined into a full-band B41, and the third frequency band and the fourth frequency band are combined into a full-band B41;
wherein each of the first frequency band, the second frequency band, the third frequency band and the fourth frequency band is part of the full-band B41.

4. The full-band radio frequency device based on the frequency band B41 according to claim 3, wherein
the full-band B41 is 2496 MHz-2690 MHz; the first frequency band is 2580 MHz-2690 MHz, the second frequency band is 2496 MHz-2580 MHz; the third frequency band is 2496 MHz-2620 MHz, and the fourth frequency band is 2620 MHz-2690 MHz.

5. The full-band radio frequency device based on the frequency band B41 according to claim 3, wherein
the main part further comprises
a first antenna, and
an antenna switch configured to control an operation state of the first antenna;
the antenna switch is connected to the first antenna, the first filter circuit and the duplex circuit; and
the diversity part further comprises
a second antenna, and
a radio frequency switch configured to control an operation state of the second antenna;
the radio frequency switch is connected to the second antenna, the second filter circuit, and a third filter circuit.

6. The full-band radio frequency device based on the frequency band B41 according to claim 3, wherein
the power amplifier circuit comprises a multi-mode multi-frequency power amplifier and a filter unit; the filter unit is configured to perform filter processing on power supply voltage which is input to the multi-mode multi-frequency power amplifier; and the multi-mode multi-frequency power amplifier is configured to perform amplification processing on an output signal and outputs the output signal to the first filter circuit and the duplex circuit.

7. The full-band radio frequency device based on the frequency band B41 according to claim 6, wherein
the filter unit comprises
a first capacitor having a 1st end and a 2nd end,
a second capacitor having a 3rd end and a 4th end,
a third capacitor having a 5th end and a 6th end,
a fourth capacitor having a 7th end and an 8th end,
a fifth capacitor having a 9th end and a 10th end, and
a sixth capacitor having an 11th end and a 12th end;
the 1st end of the first capacitor is connected to the 3rd end of the second capacitor, the 7th end of the fourth capacitor, the 11th end of the sixth capacitor, and a power supply end;
the 3rd end of the second capacitor is further connected to the 5th end of the third capacitor and a 28th pin of the multi-mode multi-frequency power amplifier;
the 7th end of the fourth capacitor is further connected to the 9th end of the fifth capacitor and a 29th pin of the multi-mode multi-frequency power amplifier;
the 11th end of the sixth capacitor is further connected to a 30th pin of the multi-mode multi-frequency power amplifier;
the 2nd end of the first capacitor, the 4th end of the second capacitor, the 6th end of the third capacitor, the 8th end of the fourth capacitor, the 10th end of the fifth capacitor, and the 12th end of the sixth capacitor are grounded.

8. The full-band radio frequency device based on the frequency band B41 according to claim 7, wherein
the first filter circuit comprises
a filter,
a seventh capacitor having a 13th end and a 14th end,
an eighth capacitor having a 15th end and a 16th end,
a ninth capacitor,
a first inductor, and
a second inductor having a 17th end and a 18th end;
a 1st pin of the filter is connected to the multi-mode multi-frequency power amplifier and the 13th end of the seventh capacitor through the first inductor, and the 14th end of the seventh capacitor is grounded;
a 2nd pin of the filter is connected to the 15th end of the eighth capacitor and the 17th end of the second inductor, and the 16th end of the eighth capacitor is grounded; and
the 18th end of the second inductor is grounded through the ninth capacitor.

9. The full-band radio frequency device based on the frequency band B41 according to claim 7, wherein
the duplex circuit comprises
a duplexer,
a tenth capacitor having a 19th end and a 20th end,
an eleventh capacitor,
a twelfth capacitor having a 21th end and a 22th end,
a thirteenth capacitor having a 23th end and a 24th end,
a fourteenth capacitor having a 25th end and a 26th end,
a third inductor having a 27th end and a 28th end,
a fourth inductor,
a fifth inductor having a 29th end and a 30th end,
a sixth inductor having a 31th end and a 32th end, and
a seventh inductor having a 33th end and a 34th end;

a 3rd pin of the duplexer is connected to the 19th end of the tenth capacitor and the 27th end of the third inductor, and the 20th end of the tenth capacitor is grounded;
the 28th end of the third inductor is connected to a 35th pin of the multi-mode multi-frequency power amplifier, and is further grounded through the eleventh capacitor;
a 6th pin of the duplexer is connected to the 29th end of the fifth inductor and the 21th end of the twelfth capacitor, and the 30th end of the fifth inductor is grounded;
the 22th end of the twelfth capacitor is grounded through the fourth inductor;
a 1st pin of the duplexer is connected to the 31th end of the sixth inductor and the 23th end of the thirteenth capacitor, and the 32th end of the sixth inductor is connected to an 8th pin of the duplexer and the 25th end of the fourteenth capacitor; and
the 24th end of the thirteenth capacitor is connected to the 33th end of the seventh inductor, and the 34th end of the seventh inductor is connected to the 26th end of the fourteenth capacitor.

10. The full-band radio frequency device based on the frequency band B41 according to claim 6, wherein
a type of the multi-mode multi-frequency power amplifier is AP7219M.

11. The full-band radio frequency device based on the frequency band B41 according to claim 9, wherein
a type of the duplexer is SAYEY2G53CA0F0A.

12. A communication terminal comprising a full-band radio frequency device based on a frequency band B41 having a main part and a diversity part; wherein
the main part comprises
a power amplifier circuit,
a first filter circuit, and
a duplex circuit;
the power amplifier circuit is configured to perform amplification processing on an output signal;
the first filter circuit is configured to perform filter processing on a transmitted or received signal in a first frequency band;
the duplex circuit is configured to transmit or receive signals in a second frequency band;
the diversity part comprises
a second filter circuit, and
a third filter circuit;
the second filter circuit is configured to perform filter processing on as received signal in a third frequency band;
the third filter circuit is configured to perform filter processing on a received signal in a fourth frequency band;
wherein the first frequency band and the second frequency band are combined into a full-band B41, and the third frequency hand and the fourth frequency band are combined into a full-band B41;
wherein
the power amplifier circuit comprises a multi-mode multi-frequency power amplifier and a filter unit; the filter unit is configured to perform filter processing on power supply voltage which is input to the multi-mode multi-frequency power amplifier; and the multi-mode multi-frequency power amplifier is configured to perform amplification processing on an output signal and outputs the output signal to the first filter circuit and the duplex circuit.

13. The communication terminal according to claim 12, wherein
the full-band B41 is 2496 MHz-2690 MHz; the first frequency band is 2580 MHz-2690 MHz, the second frequency band is 2496 MHz-2580 MHz; the third frequency band is 2496 MHz-2620 MHz, and the fourth frequency band is 2620 MHz-2690 MHz.

14. The communication terminal according to claim 12, wherein
the main part further comprises
a first antenna, and
an antenna switch configured to control an operation state of the first antenna;
the antenna switch is connected to the first antenna, the first filter circuit and the duplex circuit; and
the diversity part further comprises
a second antenna, and
a radio frequency switch configured to control an operation state of the second antenna;
the radio frequency switch is connected to the second antenna, the second filter circuit, and a third filter circuit.

15. The communication terminal according to claim 12, wherein
the filter unit comprises
a first capacitor having a 1st end and a 2nd end,
a second capacitor having a 3rd end and a 4th end,
a third capacitor having a 5th end and a 6th end,
a fourth capacitor having a 7th end and an 8th end,
a fifth capacitor having a 9th end and a 10th end, and
a sixth capacitor having an 11th end and a 12th end;
the 1st end of the first capacitor is connected to the 3rd end of the second capacitor, the 7th end of the fourth capacitor, the 11th end of the sixth capacitor, and a power supply end;
the 3rd end of the second capacitor is further connected to the 5th end of the third capacitor and a 28th pin of the multi-mode multi-frequency power amplifier;
the 7th end of the fourth capacitor is further connected to the 9th end of the fifth capacitor and a 29th pin of the multi-mode multi-frequency power amplifier;
the 11th end of the sixth capacitor is further connected to a 30th pin of the multi-mode multi-frequency power amplifier;
the 2nd end of the first capacitor, the 4th end of the second capacitor, the 6th end of the third capacitor, the 8th end of the fourth capacitor, the 10th end of the fifth capacitor, and the 12th end of the sixth capacitor are grounded.

16. The communication terminal according to claim 15, wherein
the first filter circuit comprises
a filter,
a seventh capacitor having a 13th end and a 14th end,
an eighth capacitor having a 15th end and a 16th end,
a ninth capacitor,
a first inductor, and
a second inductor having a 17th end and a 18th end;
a 1st pin of the filter is connected to the multi-mode multi-frequency power amplifier and the 13th end of the seventh capacitor through the first inductor, and the 14th end of the seventh capacitor is grounded;
a 2nd pin of the filter is connected to the 15th end of the eighth capacitor and the 17th end of the second inductor, and the 16th end of the eighth capacitor is grounded; and
the 18th end of the second inductor is grounded through the ninth capacitor.

17. The communication terminal according to claim 15, wherein
the duplex circuit comprises
a duplexer,
a tenth capacitor having a 19th end and a 20th end,
an eleventh capacitor,
a twelfth capacitor having a 21th end and a 22th end,
a thirteenth capacitor having a 23th end and a 24th end,
a fourteenth capacitor having a 25th end and a 26th end,
a third inductor having a 27th end and a 28th end,
a fourth inductor,
a fifth inductor having a 29th end and a 30th end,
a sixth inductor having a 31th end and a 32th end, and
a seventh inductor having a 33th end and a 34th end;
a 3rd pin of the duplexer is connected to the 19th end of the tenth capacitor and the 27th end of the third inductor, and the 20th end of the tenth capacitor is grounded;
the 28th end of the third inductor is connected to a 35th pin of the multi-mode multi-frequency power amplifier, and is further grounded through the eleventh capacitor;
a 6th pin of the duplexer is connected to the 29th end of the fifth inductor and the 21th end of the twelfth capacitor, and the 30th end of the fifth inductor is grounded;
the 22th end of the twelfth capacitor is grounded through the fourth inductor;
a 1st pin of the duplexer is connected to the 31th end of the sixth inductor and the 23th end of the thirteenth capacitor, and the 32th end of the sixth inductor is connected to an 8th pin of the duplexer and the 25th end of the fourteenth capacitor; and
the 24th end of the thirteenth capacitor is connected to the 33th end of the seventh inductor, and the other end of the seventh inductor is connected to the 26th end of the fourteenth capacitor.

18. The communication terminal according to claim 12, wherein
a type of the multi-mode multi-frequency power amplifier is AP7219M.

19. The communication terminal according to claim 17, wherein
a type of the duplexer is SAYEY2G53CA0F0A.

* * * * *